(12) United States Patent
Moxon (10) Patent No.: US 11,713,105 B2
(45) Date of Patent: Aug. 1, 2023

(54) WING INTEGRATED PROPULSION SYSTEM

(71) Applicant: ROLLS-ROYCE plc, London (GB)

(72) Inventor: Matthew Moxon, Derby (GB)

(73) Assignee: Rolls-Royce plc, London (GB)

( * ) Notice: Subject to any disclaimer, the term of this patent is extended or adjusted under 35 U.S.C. 154(b) by 146 days.

(21) Appl. No.: 17/344,248

(22) Filed: Jun. 10, 2021

(65) Prior Publication Data

US 2021/0387715 A1 Dec. 16, 2021

(30) Foreign Application Priority Data

Jun. 11, 2020 (GB) ...................................... 2008876

(51) Int. Cl.
| | | |
|---|---|---|
| B64C 3/32 | (2006.01) | |
| B64C 3/14 | (2006.01) | |
| B64D 27/24 | (2006.01) | |
| B64D 27/02 | (2006.01) | |
| B64C 3/38 | (2006.01) | |
| B60L 50/70 | (2019.01) | |
| B60L 50/40 | (2019.01) | |

(52) U.S. Cl.
CPC .................. *B64C 3/32* (2013.01); *B64C 3/14* (2013.01); *B64C 3/38* (2013.01); *B64D 27/24* (2013.01); *B60L 50/40* (2019.02); *B60L 50/70* (2019.02); *B60L 2200/10* (2013.01); *B64D 2027/026* (2013.01)

(58) Field of Classification Search
CPC .... B64C 3/32; B64C 3/10; B64C 3/14; B64C 3/56; B64D 2027/026
See application file for complete search history.

(56) References Cited

U.S. PATENT DOCUMENTS 9,382,000 B1 * 7/2016 Bowers ..................... B64C 3/10
9,751,614 B1 * 9/2017 Nguyen .................. B64C 15/02
(Continued)

FOREIGN PATENT DOCUMENTS

| DE | 3127257 A1 | 1/1983 |
|---|---|---|
| EP | 3235723 A1 | 10/2017 |

(Continued)

OTHER PUBLICATIONS

Bowers, et al., "On Wings of the Minimum Induced Drag: Spanload Implications for Aircraft and Birds," National Aeronautics and Space Administration, NASA/TP—2016-219072, Mar. 2016.
(Continued)

*Primary Examiner* — Timothy D Collins
*Assistant Examiner* — Justin Michael Heston
(74) *Attorney, Agent, or Firm* — Shumaker & Sieffert, P.A.

(57) ABSTRACT

An aircraft comprising a wing having a spanwise lift distribution extending from a root to a tip, the lift distribution defining an inboard region defining a positive lift contribution, an outboard region defining a negative lift contribution, and an intermediate region defining a neutral lift contribution, the neutral region being spaced from the tip and from the root. A propulsion system is provided, comprising a wing mounted propulsor. The wing mounted propulsor has a rotational axis (x) positioned substantially at a span of the wing where a value of δLift/δSpan is at a maximum for the span of the wing, and may be located at the intermediate region along the span of the wing.

14 Claims, 9 Drawing Sheets

(56) References Cited

U.S. PATENT DOCUMENTS

| | | |
|---|---|---|
| 2006/0006290 A1 | 1/2006 | Loth |
| 2016/0229527 A1 | 8/2016 | Duke |
| 2018/0009525 A1* | 1/2018 | Keegan .................... B64C 3/26 |
| 2020/0172227 A1 | 6/2020 | Way |

FOREIGN PATENT DOCUMENTS

| | | | |
|---|---|---|---|
| EP | 3650351 A1 | 5/2020 | |
| GB | 2584665 A * | 12/2020 | ............. B64C 13/16 |

OTHER PUBLICATIONS

Great Britain search report dated Nov. 10, 2020, issued in GB patent application No. 2008876.1.
Extended Search Report from counterpart European Application No. 121173725.9 dated Nov. 2, 2021, 10 pp.
Response to Extended Search Report dated Nov. 2, 2021, from counterpart European Application No. 21173725.9 filed Mar. 18, 2022, 35 pp.
Communication pursuant to Article 94(3) EPC from counterpart European Application No. 21173725.9, dated Mar. 27, 2023, 7 pp.

* cited by examiner

WING INTEGRATED PROPULSION SYSTEM

CROSS-REFERENCE TO RELATED APPLICATIONS

This specification is based upon and claims the benefit of priority from United Kingdom patent application number GB 2008876.1 filed on Jun. 11, 2020, the entire contents of which is incorporated herein by reference.

BACKGROUND

Technical Field

The present disclosure concerns an aircraft comprising a wing integrated propulsion system, and a propulsion system for an aircraft.

Description of the Related Art

It is desirable to decrease aircraft drag, to reduce fuel burn and increase range. One method of reducing drag is to provide aircraft having "tip propellers". An example experimental aircraft using such a propulsion system is the Chance-Vought XF5U. Such aircraft produce reduced induced drag (i.e. drag due to lift). Such propulsions systems also provide for increased propeller efficiency. However, such designs are compromised by several considerations. For example, by providing tip propulsors at the wing tips, a relatively large yaw force and/or roll force is generated when one of the tip propulsors fails. This requires either a large tail to counteract such forces, or requires a relatively short span wing, to reduce the forces. Such a short span wing implies a low aspect ratio, which increases induced drag, thereby removing much of the benefit of such systems. Furthermore, the large weight of such systems far from the aircraft centreline implies a large structural weight penalty. The present disclosure seeks to provide an aircraft and propulsion system that overcomes these problems.

SUMMARY

According to a first aspect there is provided an aircraft comprising, a wing having a spanwise lift distribution extending from a root to a tip, the lift distribution defining an inboard region defining a positive lift contribution, an outboard region defining a negative lift contribution, and an intermediate region defining a neutral lift contribution, the neutral region being spaced from the tip and from the root;

a propulsion system comprising a wing mounted propulsor; wherein the wing mounted propulsor has a rotational axis positioned substantially at a span of the wing where a value of $\delta Lift/\delta Span$ is at a maximum magnitude for the span of the wing.

Advantageously, it has been found that this positioning of the wing mounted propulsor in combination with the above lift distribution allows for reduced drag and increased propeller efficiency. Without wishing to be constrained by theory, this is thought to be a result of wing vortices generated at a span position corresponding to a maximum value of the first differential of the lift with respect to span resulting in a reduced advance ratio of the propulsor, leading to a higher propeller efficiency. Further features and advantages are provided by the disclosed arrangement, as set out below.

The wing mounted propulsor may comprise one of an open rotor propulsor such as a propeller, and a ducted propulsor such as a fan.

The wing mounted propulsor may be located at the intermediate region of the span of the wing. For some lift distributions, this position will correspond to the point of maximum magnitude of $\delta Lift/\delta Span$.

The wing may define a bell-shaped lift distribution as defined in NASA paper NASA/TP-2016-219072, incorporated herein by reference.

The wing mounted propulsor may be located aft of a trailing edge of the wing or may be located forward of a leading edge of the wing. Where the wing mounted propulsor is located aft of the trailing edge of the wing, the downwash generated upstream of the wing is reduced, thereby reducing drag. Similarly, where the propulsor is provided upstream of the leading edge of the wing, the upwash generated forward of the leading edge is reduced. In either case, drag is reduced.

The wing may comprise an aspect ratio greater than 5. The wing may comprise an aspect ratio greater than 10, and may comprise an aspect ratio greater than 15 and may comprise an aspect ratio greater than 5 and less than 15.

The wing mounted propulsors are relatively inboard compared to previous aircraft. This reduces the yaw generated by the propulsors in the event of a propulsor failure. This in turn allows for an increase in the span of the wing, since the wing span is no longer limited by the placement of the wing mounted open rotor propulsors, which would have been provided at the wing tips in previous designs. This higher span wing further reduces lift induced drag, in view of the lower span loading implied by a larger span, and so reduces fuel use and increases range.

The propulsion system may comprise one or more further propulsors. The one or more further propulsors may be located inboard of the wing mounted propulsors and/or intermediate region of the wing. By providing further propulsors, the propulsive requirements of the aircraft can be met by dedicated propulsors, while the wing mounted propulsors can be sized and optimised to the requirements of drag reduction, rather than thrust production. Furthermore, by placing the further propulsors inboard of the intermediate region of the wing, the weight of the propulsors provides wing bending moment relief, which counteracts the wing bending moment produced by the positive lift generated by the inboard region.

The wing may comprise a folding mechanism. The folding mechanism may define a pivot point at or outboard of the position of the wing mounted propulsor and/or the neutral point of the wing. Advantageously, a large aspect ratio wing can be provided, without requiring excessive clearance during ground operations. The provision of the pivot point outboard of the wing mounted propulsor reduces the weight that must be raised by the wing folding mechanism. The provision of the pivot point outboard of the neutral point ensures that the folding portion of the wing is urged toward the deployed position by aerodynamic forces in flight, thereby increasing safety.

The propulsion system may comprise one or more internal combustion engines, and may comprise a gas turbine engine. The or each internal combustion engine may be configured to drive one or more propulsor.

The propulsion system may comprise an electric motor configured to drive the wing mounted propulsor.

The aircraft propulsion system may comprise a parallel hybrid propulsion system, in which the internal combustion engine is mechanically coupled to at least one wing mounted propulsor. Where the aircraft propulsion system comprises a parallel hybrid system, the internal combustion engine may be coupled to an electric generator configured to provide electrical power to the electric motor.

Alternatively, the aircraft propulsion system may comprise a series hybrid propulsion system, in which the internal combustion engine is coupled to an electric generator configured to provide electrical power to the propulsor motor, and wherein the internal combustion engine is not mechanically coupled to a propulsor.

As a further alternative, the aircraft propulsion system may comprise an electric propulsion system, wherein the propulsion system comprises one or more electric storage devices, such as a fuel cell, capacitor or chemical cell configured to provide electrical power to the electric motor.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
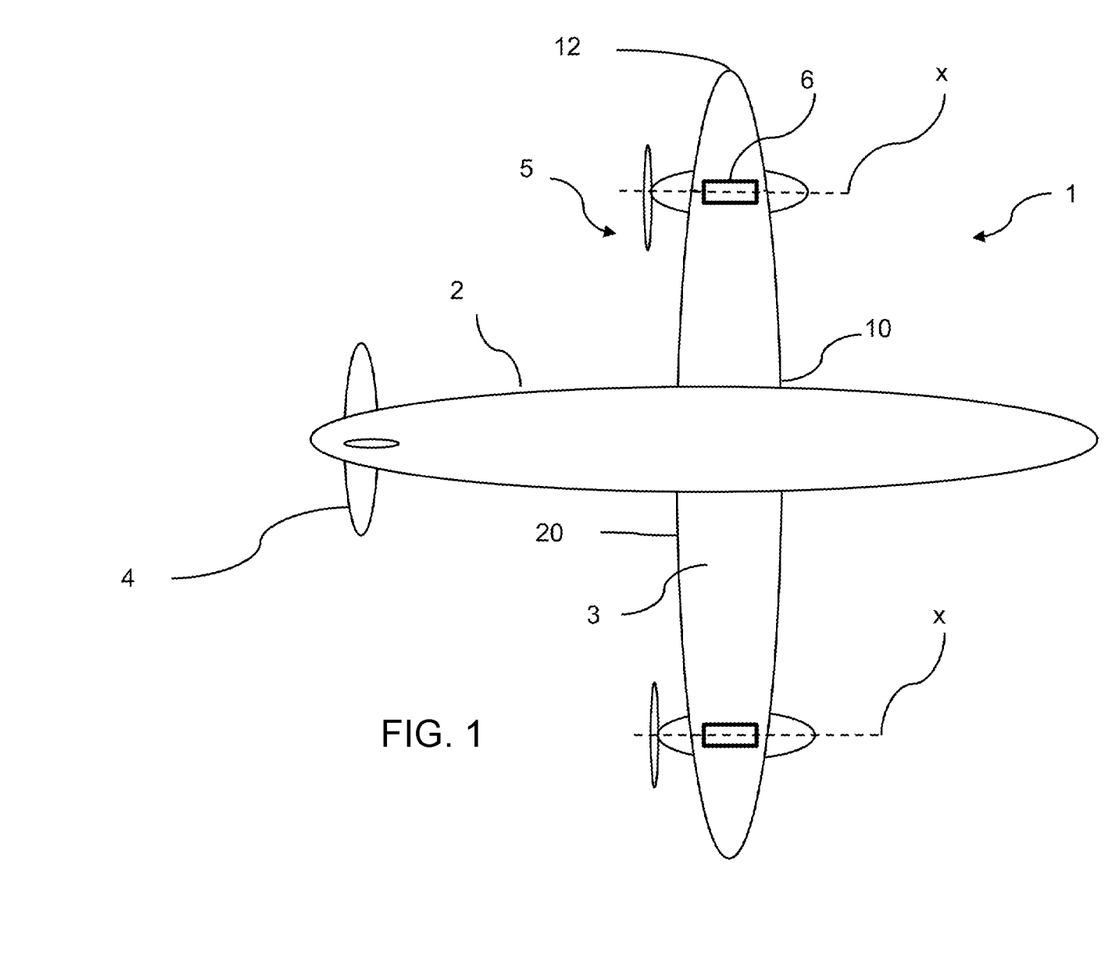
FIG. 1 is a plan view of a first aircraft.

With reference to FIG. 1, a plan view of an aircraft 1 is shown. The aircraft 1 comprises a fuselage 2, wings 3, tail 4 and a propulsion system comprising a pair of open rotor wing mounted propellers 5. Each propeller 5 is mechanically driven by a respective internal combustion engine in the form of a gas turbine engine 6.

Figure 3:
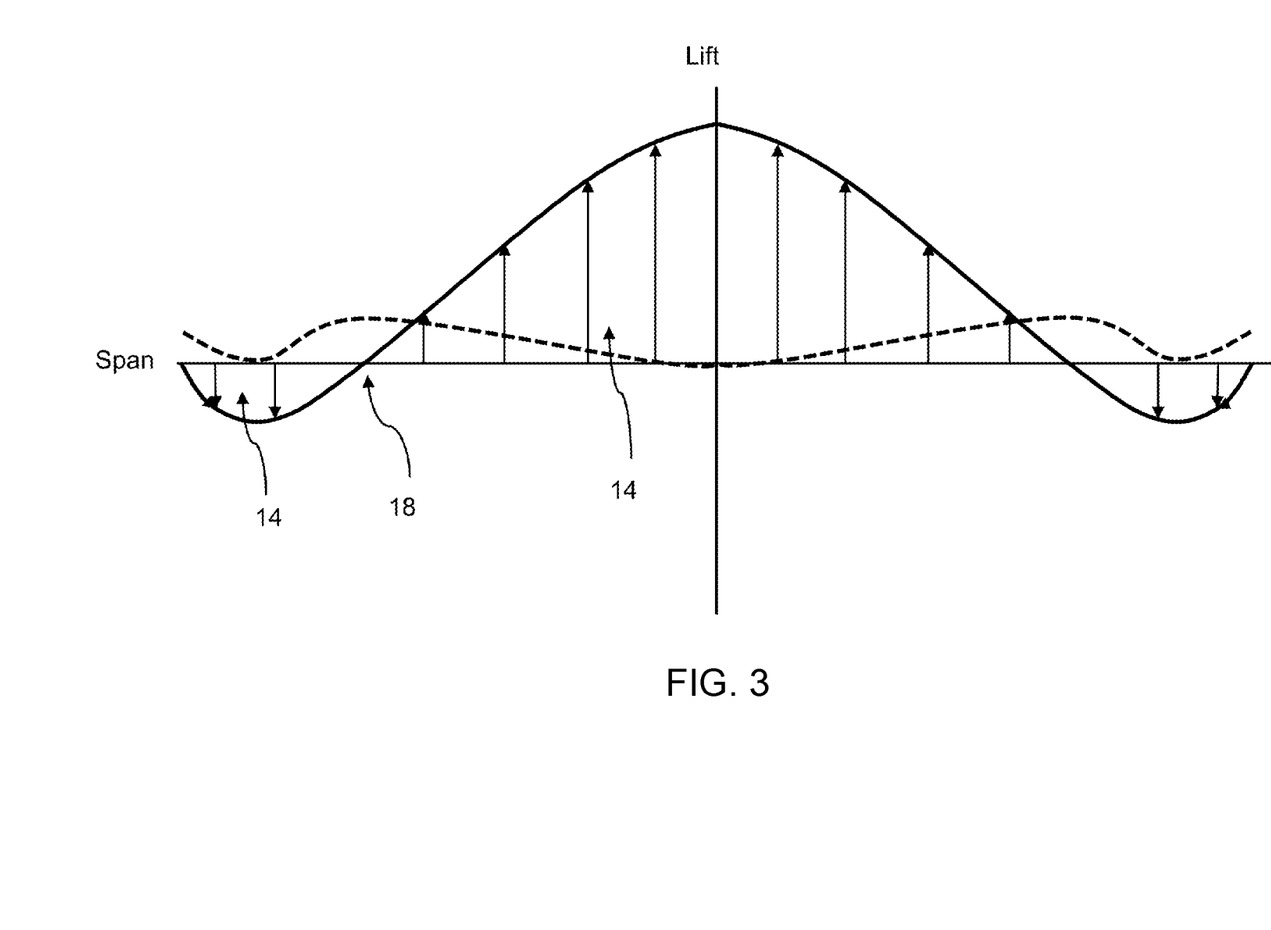
FIG. 3 is a graph showing a lift distribution and the first differential of the lift distribution with respect to span for a wing of the aircraft of FIGS. 1 and 2.

The wing 3 has a generally elliptical planform (though other planforms could be employed), and is shaped to provide a lift distribution as shown in FIG. 3. As will be understood by the skilled person, the lift distribution is the lift coefficient produced by the wing under given conditions such as angle of attack of the aerofoil, the Reynolds number of the flow, and its Mach number, as a function of the span of the wing. As is well known, the lift coefficient $C_L$ is given as:

$$C_L = \frac{L}{qS}$$

Where L is the lift force, S is the relevant surface area, and Q is the fluid dynamic pressure, in turn linked to the fluid density and flow speed.

In the present disclosure, the wings 3 have a "bell-shaped" lift distribution, similar to that described in NASA Technical Report TP-2016-219072, published in 2016, the whole of which is incorporated herein by reference. Such wings are thought to have benefits in terms of overall aircraft drag, taking into account the structural weight of the wing. As will be understood by the skilled person, the lift coefficient can be modified by adjusting various parameters. For instance, lift coefficient can be increased by increasing the camber of the wing section, and reduced by reducing the camber. Different aerofoil sections can be used. Similarly, increasing the chord will typically increase lift coefficient. Increasing local angle of attack can also increase lift coefficient, and so "twist" can be applied to the wing to control local angle of attack. Any one or a combination of these techniques can be applied to provide a desired local section lift coefficient.

The wing 3 of the aircraft 1 of the present disclosure comprises several distinct regions. A root 10 of the aircraft wing 3 is defined at an inboard position of the wing 3, adjacent the fuselage 2. Similarly, a tip 12 is defined at the extreme outboard end of the span of the wing 3.

Figure 2:
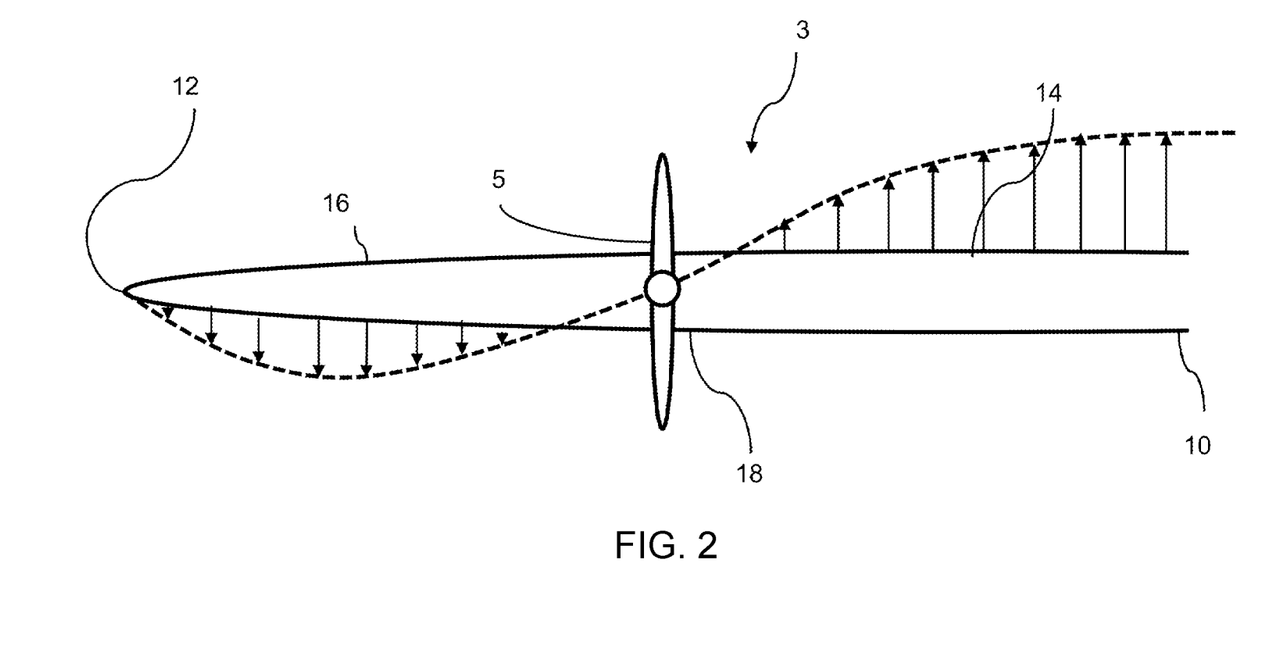
FIG. 2 is a front view of part of the aircraft of FIG. 1.

Referring to FIG. 2, a positive lift region 14 is defined at an inboard region of the wing 3. In the positive lift region, the wing 3 is arranged to provide lift in an upward direction, as conventionally defined, at neutral or positive angles of attack. It will be understood that the lift provided varies as a function of span, with more lift being generated at the root 10 than at positions closer to the tip 12. Outboard of the positive lift region 14, adjacent the tip 12, is a negative lift region 16. In this region, a downforce is generated at a positive or neutral angle of attack. Between these two regions is an intermediate neutral region 18. The neutral region 18 provides little or no lift or downforce. In some cases, the neutral lift region 18 may comprise a single point on the span of the wing 3, at the point at which the positive and negative lift regions 14, 16 meet.

Typically, the positive lift region 12 occupies the majority of the span of the wing 3, and may extend between 60 and 80% of the span of the wing from the root 10. In one example, the positive lift region extends approximately 70% of the span of the wing 3 from the root 10. Similarly, the negative lift region occupies between 10 and 30% of the span of the wing from the tip 12. As can be seen, the lift generated by the positive lift portion 14 is greater than the downforce generated by the negative lift portion 16, such that the wing 3 produces net upward lift. Typically, in total, the positive lift portion 14 produces between 10 and 20 times as much lift as the negative lift portion 16 produces downforce.

The section lift coefficient of the negative lift portion 16 varies across the span, with a maximum at a central region, and minima at the tip 12 and adjacent the neutral lift region 16.

Referring now to FIG. 3, the continuous line A shows the lift distribution, while the dotted line shows the first differential with respect to span δLift/δSpan of the lift distribution. As can be seen, the wing mounted propellers 5 are positioned such that their rotational axis X is coincident with, or adjacent, the neutral lift region 16, and with the position of maximum magnitude (positive or negative) of δLift/δSpan, which in this particular case coincide. Each propeller 5 is positioned behind a trailing edge 20 of the wing 3. The propeller 5 positioned on the port wing rotates in a clockwise direction when viewed from the aft of the aircraft, and the propeller 5 positioned on the starboard wing rotates in an anti-clockwise direction when viewed from the aft of the aircraft.

Without wishing to be limited by theory, this is believed to have the effect of increasing propeller efficiency, as outlined below.

As will be understood, as they generate lift, wings generate vortices. In traditional wing designs, these vortices are generated at the tips of the wings, with a vortex emanating from the port wing and rotating in a counter-clockwise direction when viewed from the aft of the wing, and another vortex emanating from the starboard wing and rotating in a clockwise direction when viewed from the aft of the wing. However, in the case of wing having a negative lift region at the tip, vortices will instead be generated at the neutral lift portion, where the positive and negative lift portions meet. By placing a propeller 5 in this region, with each propeller configured to rotate in a direction opposite to the direction of rotation of the local vortex, the propeller interacts with the vortex. This results in an increase in propeller efficiency.

Ordinarily, propellers generate thrust having a circumferential component, which imparts swirl on the airflow, rather than thrust. This effectively reduces propeller efficiency. The wing vortices turn this swirling flow in the direction of the aircraft longitudinal axis, thereby converting this swirl to thrust, and increasing propulsive efficiency. In other words, the advance ratio of the propellers is reduced, leading to higher propeller efficiency.

This effect can be managed by controlling the swirl imparted on the airflow by the propeller 5. As will be understood, propeller swirl can be controlled by controlling one or more of propeller diameter, blade chord, pitch and helix angle. The propeller 5 may be controlled such that the vortex is substantially eliminated at different flight conditions, by controlling blade pitch in flight. Additionally, this arrangement may allow for a wider design space, as designs that would cause a large degree of swirl would normally be rejected as inefficient—in this arrangement, these inefficiencies are eliminated. For example, the propeller may have a twist that is designed to exploit the incoming vortex.

In contrast to prior aircraft, the wing mounted propellers 5 of the present disclosure are provided relatively inboard along the span of the wing 5, rather than at the tips, as would be conventional. This gives the designer several opportunities. For example, the wing mounted propellers 5 of the present disclosure may be provided at between 50% and 95% of the span of the wing from the root, or between 60% and 80% of the span of the wing, and preferably at about 70% of the span of the wing. In other words, the rotational axis X of the wing mounted propellers 5 are preferably located within 10% of the span of the neutral lift point, and preferably within 5% of the span of the neutral lift point.

Since the wing mounted propellers 5 are not located at the tips, the span of the wing 3 (and so its aspect ratio) can be increased, without risking excessive yaw in the event of a propeller or engine failure. This increased aspect ratio will reduce induced drag, since induced drag is known to be related to aspect ratio, in accordance with the following formula:

$$C_{Di} = \frac{C_L^2}{\pi e AR}$$

Where $C_{Di}$ is the drag due to induced drag, e is the Oswald efficiency, and AR is the aspect ratio. In the present case, it is thought that an aspect ratio of between 5 and 15 can be achieved, without causing excessive yaw in the event of an engine failure, even where the aircraft is a twin propeller aircraft.

Similarly, the designer is able to choose a vertical tail having a low tail volume coefficient, in view of the relatively low yaw moment caused by one engine being inoperative. Indeed, in some cases, elimination of the vertical tail may be possible, in view of the elimination of adverse yaw in aircraft having this lift distribution.

Further advantages are provided. In view of the downforce/upwash generated by the wing at the tip, and the weight of the propeller 5 inboard, significant wing bending moment relief is provided. This allows the structural weight to be reduced, which can be traded for lower overall aircraft weight, or further increased aspect ratio. In either case, fuel use is reduced, and range increased.

Another further advantage of the reduced vortex is the reduction in turbulent aircraft wake. This may allow for closer aircraft spacing, which may in turn allow for close formation flying for the purposes of aircraft fuel reduction, or shorter spacing for aircraft taking off and landing, which may reduce congestion at airports.

Figure 4:
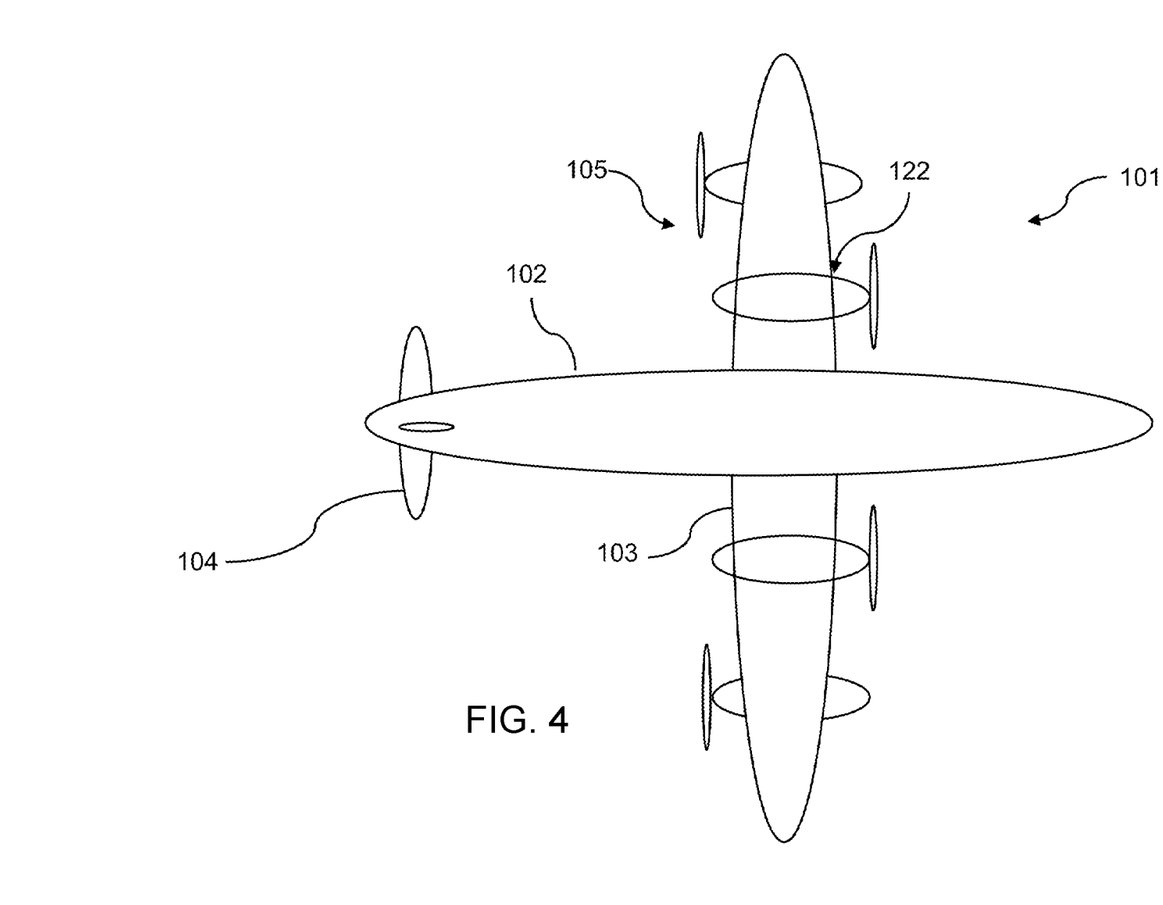
FIG. 4 is a plan view of a second aircraft.

FIG. 4 shows a second aircraft 101. The second aircraft 101 is similar to the aircraft 1, and also comprises a wing 103 having the lift distribution shown in FIG. 2, having positive lift 114, negative lift 116 and neutral 118 regions, and having wing mounted propellers 105 provided at the neutral lift region 118. However, there are also various differences.

The propulsion system of the aircraft 101 comprises further propulsors 122 provided inboard of the wing mounted propellers 105, and also inboard of the neutral lift region 118. The further propulsors 122 are also in the form of propellers in this embodiment, though they could take different forms, such as ducted propulsors. Similarly, the further propulsors 122 are provided upstream of the leading edge of the wing 103, but could be positioned in different locations, or could be attached to the fuselage.

By providing further propulsors 122 inboard of the wing mounted propulsors 105, several advantages are realised. Firstly, only a proportion of the thrust required by the aircraft must be generated by the wing mounted propulsors 105. This reduces their required size and weight, and also reduces the consequence of the failure of such a device. Consequently, yaw in the event of an engine failure is again reduced, which gives rise to the advantages outlined above. Secondly, additional wing bending moment relief is provided, since the weight of the further propulsors counteracts the bending caused by the lift generated by the wing in the positive lift region 14. Since the negative lift region 116 does not contribute to lift, no bending moment relief is provided by providing engines in these locations.

In order to take further advantage of this bending moment relief, additional structure and equipment may be installed in the wing inboard of the neutral lift region. For instance, fuel tanks 124 may be provided at this location.

Figure 5:
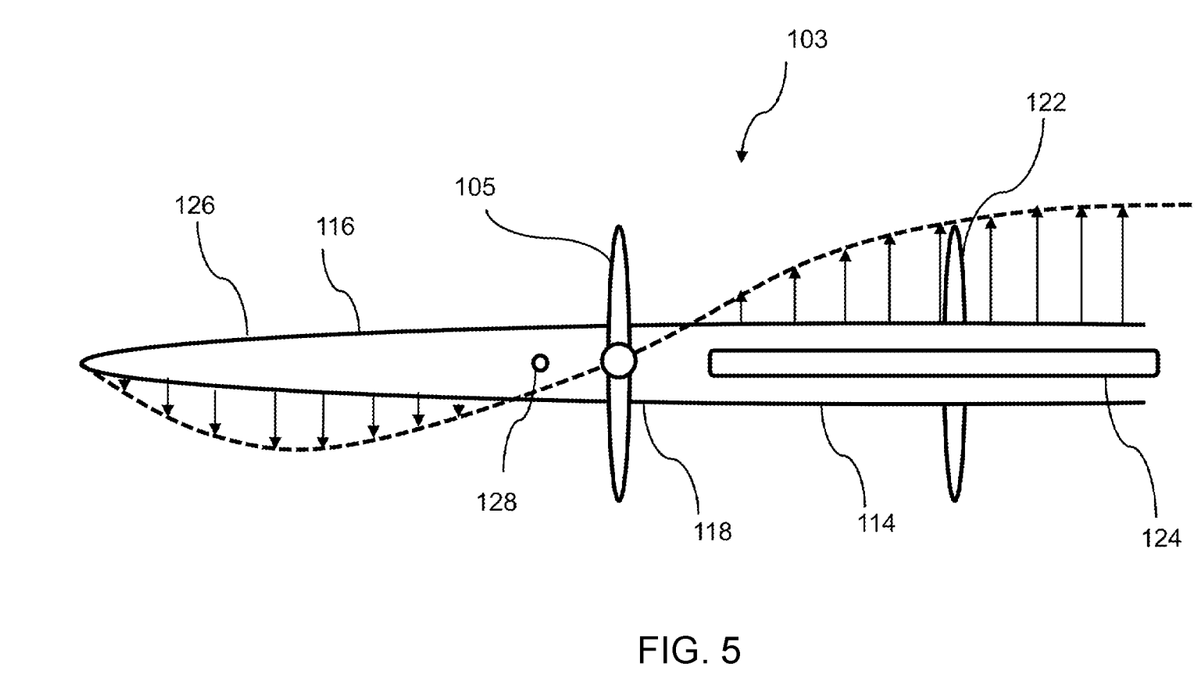
FIG. 5 is a front view of part of the aircraft of FIG. 4 having wing tips in a deployed position.
Figure 6:
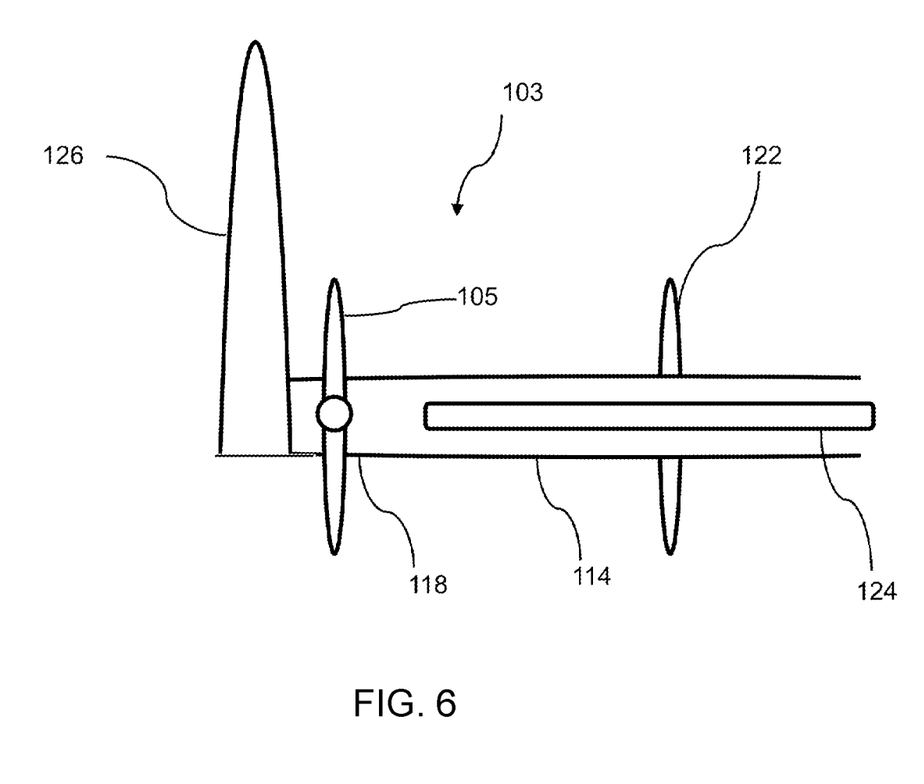
FIG. 6 is a front view of the part of the aircraft shown in FIG. 4 having wing tips in a stowed position.

Additional features are provided of the aircraft 101. The aircraft comprises pivotable wings, an outboard portion 126 of which can be pivoted between a deployed position (as shown in FIG. 5) and a stowed position (as shown in FIG. 6). In the stowed position, the effective span of the aircraft wings is reduced, improving ground handling. For instance, gate size requirements are reduced. Consequently, wing span can again be increased, without facing ground handling constraints.

A pivot point 128 for the wing pivoting system is located outboard of the wing mounted propeller 105, and possibly also outboard of the neutral lift region 118. Consequently, the weight of the pivotable portion of the wing is relatively low, thereby reducing the weight and power requirements for the wing folding actuators. Furthermore, since the outboard portion 126 is coincident with the negative lift portion 116 of the wing 103, aerodynamic forces urge the portion 126 to the deployed position in flight, thereby increasing safety.

The propulsion system of the aircraft 101 also differs from that of the aircraft 1 in other ways.

Figure 7:
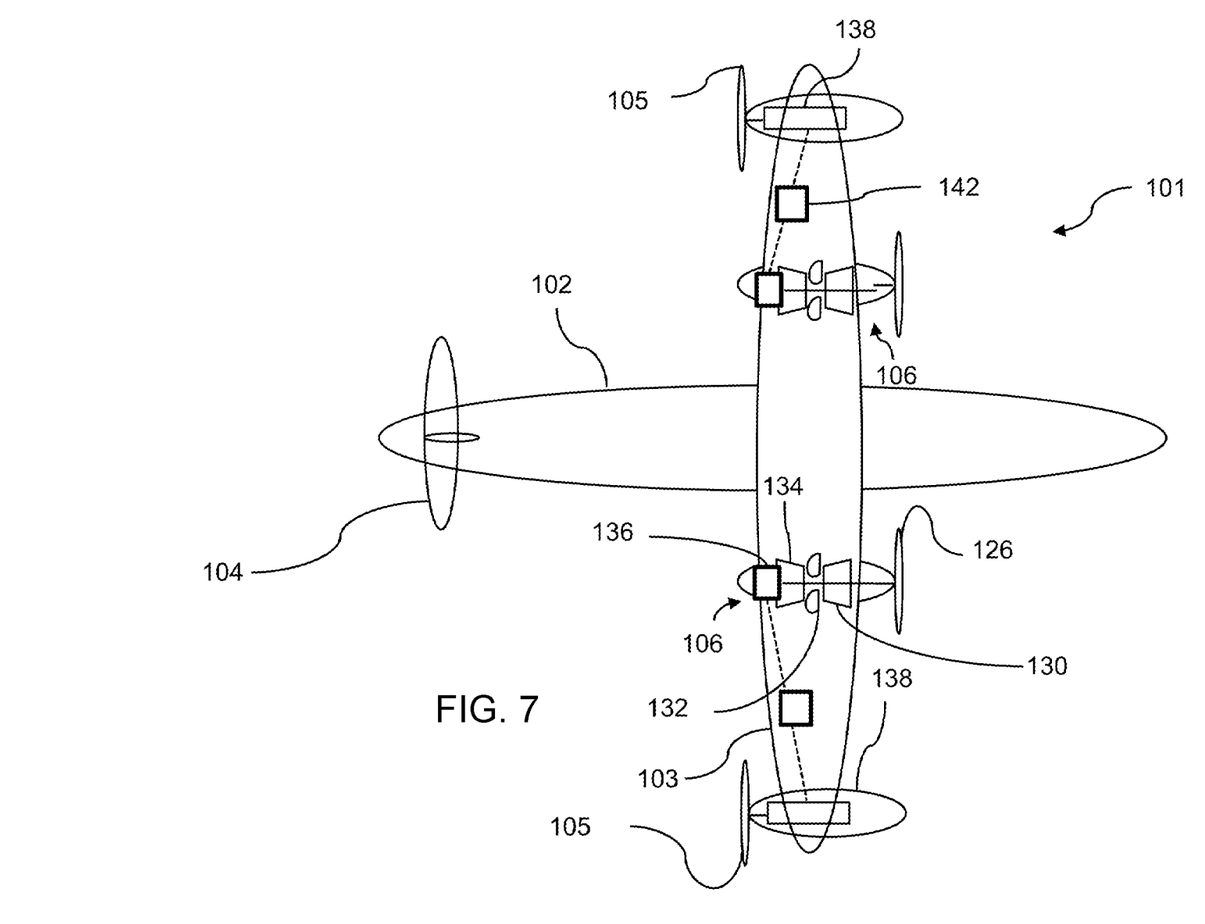
FIG. 7 is a schematic diagram of the propulsion system of the aircraft of FIGS. 4 to 6.

FIG. 7 shows the propulsion system of the aircraft 101 in more detail. The propulsion system includes a pair of internal combustion engines in the form of gas turbine engines 106. Each gas turbine engine 106 comprises, in axial flow series, a propulsor in the form of a propeller 122, a compressor 130, combustion equipment 132 and a turbine 134.

The gas turbine engine 106 works in the conventional manner so that air is accelerated by the propeller 126 to produce two air flows: a first core air flow into the compressor 130 and a second air flow which bypasses the compressor 130 to provide propulsive thrust. The core air flows through the compressor 130 where it is compressed, before delivering that air to the combustion equipment 132, where it is mixed with fuel and the mixture combusted. Fuel is supplied to the combustors 13 via fuel injectors (not shown). The resultant hot combustion products then expand through, and thereby drive the turbine 134 before being exhausted through a nozzle to provide additional propulsive thrust. The turbine 134 drives the compressor 130 and propeller 126, by a suitable interconnecting shaft. An electrical generator 136 is provided, which is coupled to the gas turbine engine shaft. Consequently, rotation of the shaft generates propulsive thrust via the propeller 126, and also generates electrical power.

Other gas turbine engines to which the present disclosure may be applied may have alternative configurations. By way of example such engines may have an alternative number of interconnecting shafts (e.g. three) and/or an alternative number of compressors and/or turbines. Further, the engine may comprise a gearbox provided in the drive train from a turbine to a compressor and/or fan.

The propulsion system 5 further comprises one or more electrical machines driving at one or more propulsors. In particular, the system 5 comprises a pair of electric motors 138, which drive a respective wing mounted propulsor 105. The motor 138 is of a conventional type, such as an induction or permanent magnet electric machine.

The electric motor 138 is optionally coupled to an energy storage device (142) in the form of one or more of a chemical battery, fuel cell, and capacitor, which provides the electric motor 138 with electrical power during operation.

Figure 8:
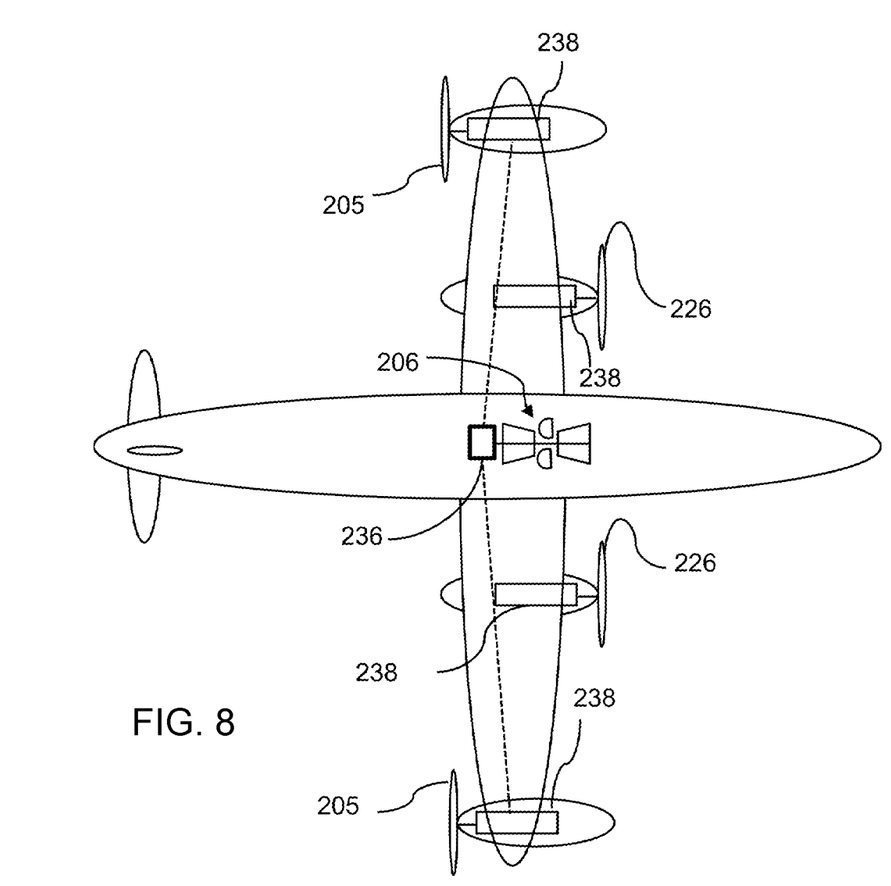
FIG. 8 is a schematic diagram of an alternative propulsion system for the aircraft of FIGS. 4 to 7.

An alternative propulsion system for the aircraft 101 is shown in FIG. 8. In this case, a single gas turbine engine 206 is provided, which is similar the gas turbine engines 106. The gas turbine engine 206 comprises an electric generator 236, which is in turn coupled to electric motors 238, which drive a respective propulsor 205, 226. In this case, all of the propulsors are driven by electric motors, and so the system can be described as being a series hybrid.

Figure 9:
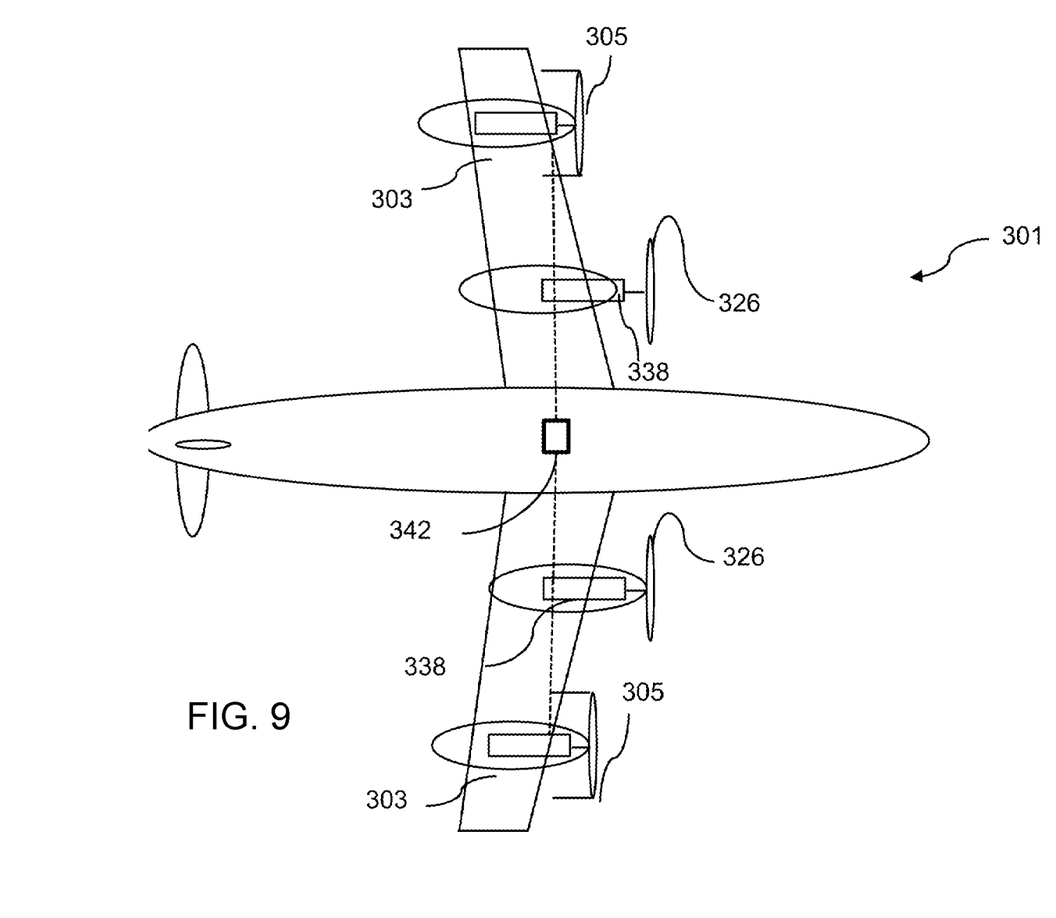
FIG. 9 is a schematic diagram of a third aircraft.

FIG. 9 shows an alternative aircraft 301. The aircraft again comprises wings 303 and a fuselage. The wings 303 in this instance have a rearward swept planform, in which the leading edge at the tip is located aft of the leading edge at the root. This both reduces drag at high transonic speeds, and allows for a further reduction of vertical tail volume, in view of increased longitudinal stability. Otherwise, the wing 305 is similar to the wing 5, having the lift distribution shown in FIG. 3.

In this case, wing mounted propulsors 305 are provided at the neutral lift point, with further propellers 326 provided inboard. The wing mounted propulsors 305 are in the form of ducted propulsors (fans), and are provided upstream of the leading edge of the wing, to reduce upwash generated forward of the wing. Again, this will be expected to reduce drag, and increase propulsive efficiency.

The aircraft 301 is an electric aircraft, comprising an energy storage unit in the form of a fuel cell 342. The fuel cell provides electric power to motors 338. The fuel cell could be replaced or supplemented by other electric power sources, such as chemical batteries, capacitors etc.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, gas turbine engines having more or fewer shafts could be provided. Electric motors having different topologies could be provided, such as topologies in which the stator is provided radially inside of the rotor. Different fuels and coolant fluids could be utilised. Different components of the motors could be cooled using the cooling system.

The invention claimed is:

1. An aircraft comprising: a wing having a spanwise lift distribution extending from a root to a tip, the lift distribution defining an inboard region defining a positive lift contribution, an outboard region defining a negative lift contribution, and an intermediate region defining a neutral lift contribution, the intermediate region being spaced from the tip and from the root, wherein the wing defines a bell-shaped lift distribution; and a propulsion system comprising a wing mounted propulsor; wherein the wing mounted propulsor has a rotational axis positioned substantially at a span of the wing where a value of δLift/δSpan is at a maximum magnitude for the span of the wing.

2. An aircraft according to claim 1, wherein the wing mounted propulsor comprises one of an open rotor propulsor such as a propeller, and a ducted propulsor such as a fan.

3. An aircraft according to claim 1, wherein the propulsor is located at the intermediate region of the span of the wing.

4. An aircraft according to claim 1, wherein the wing mounted propulsor is located aft of a trailing edge of the wing.

5. An aircraft according to claim 1, wherein the wing mounted propulsor is located forward of a leading edge of the wing.

6. An aircraft according to claim 1, wherein the wing comprises an aspect ratio greater than 5 and less than 15.

7. An aircraft according to claim 1, wherein the propulsion system comprises one or more further propulsors.

8. An aircraft according to claim 7, wherein the one or more further propulsors are located inboard of the wing mounted propulsors.

9. An aircraft according to claim 1, wherein the wing comprises a folding mechanism which defines a pivot point at or outboard of the position of the wing mounted propulsor.

10. An aircraft according to claim 1, wherein the propulsion system comprises one or more internal combustion engines which are configured to drive one or more propulsor.

11. An aircraft according to claim 1, wherein the propulsion system comprises an electric motor configured to drive the wing mounted propulsor.

12. An aircraft according to claim 11, wherein the aircraft propulsion system comprises a parallel hybrid propulsion system, in which the internal combustion engine is mechanically coupled to at least one wing mounted propulsor, and wherein the internal combustion engine may be coupled to an electric generator configured to provide electrical power to the electric motor.

13. An aircraft according to claim 12, wherein the internal combustion engine is coupled to an electric generator configured to provide electrical power to the propulsor motor and wherein the internal combustion engine is not mechanically coupled to a propulsor.

14. An aircraft according to claim 11, wherein the propulsion system comprises one or more electric storage devices, wherein the one or more electrical storage devices comprises at least one of a fuel cell, capacitor or chemical cell configured to provide electrical power to the electric motor.

* * * * *